United States Patent
Toyofuku

(10) Patent No.: US 9,061,632 B2
(45) Date of Patent: Jun. 23, 2015

(54) VEHICLE NIGHT VISION SUPPORT SYSTEM AND CONTROL METHOD FOR THE SAME

(75) Inventor: Kunihiko Toyofuku, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 13/391,157

(22) PCT Filed: Oct. 7, 2010

(86) PCT No.: PCT/IB2010/002532
§ 371 (c)(1), (2), (4) Date: Feb. 17, 2012

(87) PCT Pub. No.: WO2011/048454
PCT Pub. Date: Apr. 28, 2011

(65) Prior Publication Data
US 2012/0320207 A1 Dec. 20, 2012

(30) Foreign Application Priority Data
Oct. 21, 2009 (JP) .................................. 2009-242481

(51) Int. Cl.
| | |
|---|---|
| *H04N 5/33* | (2006.01) |
| *H04N 7/18* | (2006.01) |
| *B60R 1/00* | (2006.01) |
| *G02B 27/01* | (2006.01) |
| *G08G 1/16* | (2006.01) |

(52) U.S. Cl.
CPC ............. *B60R 1/00* (2013.01); *B60R 2300/106* (2013.01); *B60R 2300/20* (2013.01); *B60R 2300/302* (2013.01); *B60R 2300/308* (2013.01); *B60R 2300/8093* (2013.01); *G02B 27/01* (2013.01); *G02B 2027/0138* (2013.01); *G02B 2027/014* (2013.01); *G08G 1/16* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 6,538,622 B1 * | 3/2003 | Kojima et al. | .................... 345/7 |
| 2006/0006331 A1 | 1/2006 | Adamietz et al. | |
| 2006/0164219 A1 | 7/2006 | Knoll | |

(Continued)

FOREIGN PATENT DOCUMENTS

| | | |
|---|---|---|
| DE | 102 53 509 A1 | 6/2004 |
| DE | 10 2007 045 932 A1 | 4/2009 |

(Continued)

OTHER PUBLICATIONS

Japanese Office Action issued in Application No. 2009-242481; Dated Aug. 25, 2011 (With Translation).

(Continued)

*Primary Examiner* — Dave Czekaj
*Assistant Examiner* — Mohammad J Rahman
(74) *Attorney, Agent, or Firm* — Oliff PLC

(57) ABSTRACT

A vehicle night vision support system includes an infrared camera that captures an image ahead of a vehicle; a main display that displays the image captured by the infrared camera; a sub-display; and a control unit that controls the sub-display so as to display warning information when it is determined that there is an object in the image displayed on the main display, and controls the sub-display so as to display the warning information when it is estimated or detected that an object that has disappeared from the displayed image is present in the field of view of a driver.

10 Claims, 5 Drawing Sheets

(56) References Cited

U.S. PATENT DOCUMENTS

| | | | |
|---|---|---|---|
| 2007/0182528 A1* | 8/2007 | Breed et al. | 340/435 |
| 2007/0263902 A1* | 11/2007 | Higuchi et al. | 382/104 |
| 2008/0316011 A1 | 12/2008 | Kirsch et al. | |
| 2009/0022423 A1* | 1/2009 | Ehlgen et al. | 382/284 |
| 2011/0205371 A1* | 8/2011 | Nagata et al. | 348/207.1 |
| 2011/0216194 A1* | 9/2011 | Kosaki | 348/148 |

FOREIGN PATENT DOCUMENTS

| | | |
|---|---|---|
| JP | A-2003-306103 | 10/2003 |
| JP | A-2005-081860 | 3/2005 |
| JP | A-2005-088630 | 4/2005 |
| JP | A-2008-040974 | 2/2008 |
| WO | WO 2007/028630 A1 | 3/2007 |
| WO | WO 2007/135856 A1 | 11/2007 |

OTHER PUBLICATIONS

Written Opinion of the International Searching Authority, Issued in Application No. PCT/IB2010/002532; Dated Feb. 3, 2011.

International Search Report issued in Application No. PCT/IB2010/002532; Dated Feb. 3, 2011.

\* cited by examiner

VEHICLE NIGHT VISION SUPPORT SYSTEM AND CONTROL METHOD FOR THE SAME

BACKGROUND OF THE INVENTION

1. Field of the Invention

The invention relates to a vehicle night vision support system that displays an image, captured in the nighttime by an infrared camera mounted on a vehicle, on an in-vehicle display, or the like, so that the captured image can be visually recognized in a vehicle cabin, and a control method for the same.

2. Description of the Related Art

There is known an existing system in which an infrared camera that is able to, for example, recognize a pedestrian even in the nighttime captures an image and then the captured image is displayed in a vehicle cabin.

In relation to this, Japanese Patent Application Publication No. 2005-081860 (JP-A-2005-081860) describes a vehicle display system. The vehicle display system includes a driving environment detecting means that detects a driving environment ahead of a vehicle, and changes an area captured by an image capturing means, such as an infrared camera, into a wide angle depending on the detected driving environment. The vehicle display system detects, for example, the presence of a preceding vehicle as the driving environment ahead of the vehicle, and changes the captured area into a wide angle when there is the preceding vehicle.

In addition, Japanese Patent Application Publication No. 2005-088630 (JP-A-2005-088630) describes a vehicle night vision system. The vehicle night vision system swivels an image capturing means, such as an infrared camera, horizontally in a vehicle transverse direction on the basis of a steering angle signal detected by a steering angle sensor. Note that the image capturing means is swiveled horizontally in the vehicle transverse direction in synchronization with head lights.

Incidentally, an image captured by the infrared camera is displayed on a display device (which is also used for, for example, a navigation display) installed at the center portion of an instrument panel, or the like, or is displayed on a head up display (HUD). The HUD is a display device that, for example, reflects light, emitted from a light-emitting device installed at the upper portion of the instrument panel, from a front glass to allow a driver to visually recognize the emitted light.

Then, there has been proceeding toward commercialization of a system that supports vision of a driver on the basis of an image captured by an infrared camera using such a plurality of display devices. In this system, an image captured by an infrared camera is, for example, displayed on a main display installed at the center portion of an instrument panel, or the like, and warning information, such as an icon that indicates the shape of an object, is displayed on a sub-display, such as an HUD, when the displayed image contains a warning target object, such as a pedestrian.

However, according to the existing systems, the driver may experience a feeling of strangeness because of a difference between the angle of view of the infrared camera and the field of view of the driver.

The angle of view of the infrared camera is normally narrower than the field of view of a driver in consideration of a resolution, a requirement for capturing an image at a location farther from the illumination limit of the head lamps, and the like. This is because the accuracy of remote image capturing decreases when the image capturing range is set to a wide angle.

Thus, in the process in which an object ahead of the vehicle approaches the vehicle and then passes by the vehicle to behind the vehicle, there is a period of time during which the driver visually recognizes the object although the object is not captured by the infrared camera (or is captured by the infrared camera but the object is located outside the display range). During the above period of time, the driver may experience a feeling of strangeness against a situation that the warning information of the sub-display disappears although the driver visually recognizes the pedestrian.

In addition, the situation that the object can be visually recognized by the driver still requires attention to the object when driving. Thus, when the warning information of the sub-display disappears, it may result in an insufficient support.

SUMMARY OF THE INVENTION

The invention provides a vehicle night vision support system that is able to contribute to further safe driving without making a driver experiencing a feeling of strangeness, and a control method for the same.

A first aspect of the invention provides a vehicle night vision support system. The vehicle night vision support system includes: an infrared camera that captures an image ahead of a vehicle; a main display that displays the image captured by the infrared camera; a sub-display; and a control unit that determines whether there is an object in the displayed image on the main display and, when the control unit determines that there is the object in the displayed image, controls the sub-display so as to display warning information on the object, and the control unit estimates or detects whether an object that has disappeared from the displayed image is present in the field of view of the driver and, when the control unit estimates or detects that the object that has disappeared from the displayed image is present in the field of view of the driver, controls the sub-display so as to display the warning display.

A second aspect of the invention provides a control method for a vehicle night vision support system that includes an infrared camera that captures an image ahead of a vehicle, a main display that displays the image captured by the infrared camera and a sub-display. The control method includes: determining whether there is an object in the displayed image on the main display; when it is determined that there is the object in the displayed image, controlling the sub-display so as to display warning information on the object; estimating or detecting whether an object that has disappeared from the displayed image is present in the field of view of the driver; and when it is estimated or detected that the object that has disappeared from the displayed image is present in the field of view of the driver, controlling the sub-display so as to display the warning information.

With the first aspect and the second aspect of the invention, not only when there is an object, such as a pedestrian, in the image displayed on the main display but also when it is estimated or detected that an object that has disappeared from the image displayed on the main display is present in the field of view of the driver, the sub-display is controlled so as to display the warning information. Thus, it is possible to contribute to further safe driving without making the driver experience a feeling of strangeness.

In the aspects of the invention, the sub-display may be a head up display.

In the aspects of the invention, the vehicle night vision support system may further include: a vehicle speed detector that detects a vehicle speed; and a steering angle detector that detects a steering angle, wherein the control unit may calculate a relative position of the object with respect to the vehicle on the basis of a position of the object in the displayed image, and the control unit may estimate whether the object that has disappeared from the displayed image is present in the field of view of the driver on the basis of the relative position and a driving state of the vehicle, calculated on the basis of the vehicle speed detected by the vehicle speed detector and the steering angle detected by the steering angle detector.

In the aspects of the invention, the main display may display a center portion of the image captured by the infrared camera with respect to a horizontal direction of the captured image.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
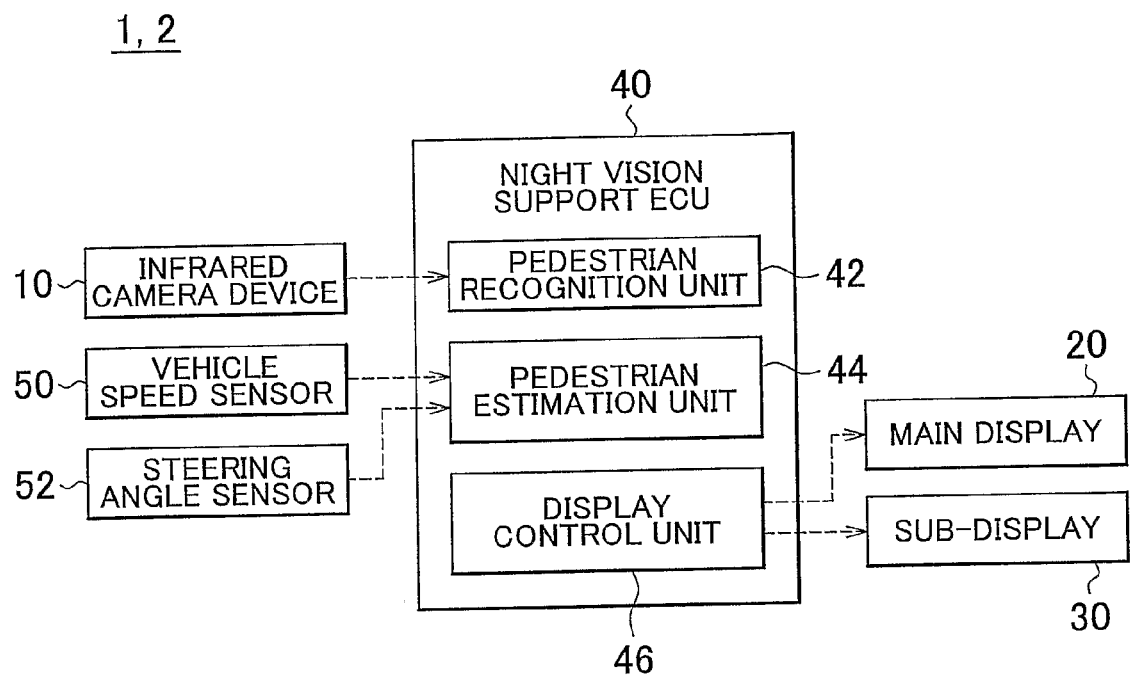
FIG. 1 is an example of the system configuration of each of vehicle night vision support systems 1 and 2 according to first and second embodiments of the invention.

Hereinafter, a vehicle night vision support system 1 according to a first embodiment of the invention will be described with reference to the accompanying drawings. FIG. 1 is an example of the system configuration of the vehicle night vision support system 1 according to the first embodiment of the invention. The vehicle night vision support system 1 includes an infrared camera device 10, a main display 20, a sub-display 30 and a night vision support electronic control unit (ECU) 40 as major components.

The infrared camera device 10 includes an infrared irradiation device and an infrared camera 12. The infrared irradiation device is, for example, attached to a front grill, and irradiates near infrared forward of the vehicle. The infrared camera 12 is, for example, attached to the inside of the upper center portion of a front glass, and captures an image diagonally forward of the vehicle.

Note that the infrared camera device 10 is not limited to a device that irradiates infrared to thereby capture reflected light but it may be a device that captures infrared radiated from a pedestrian because of body heat. In addition, because irradiated light of a head lamp and irradiated light of a fog lamp contain infrared, the infrared camera device 10 may be configured to mainly capture the light reflected from a pedestrian.

Figure 2:
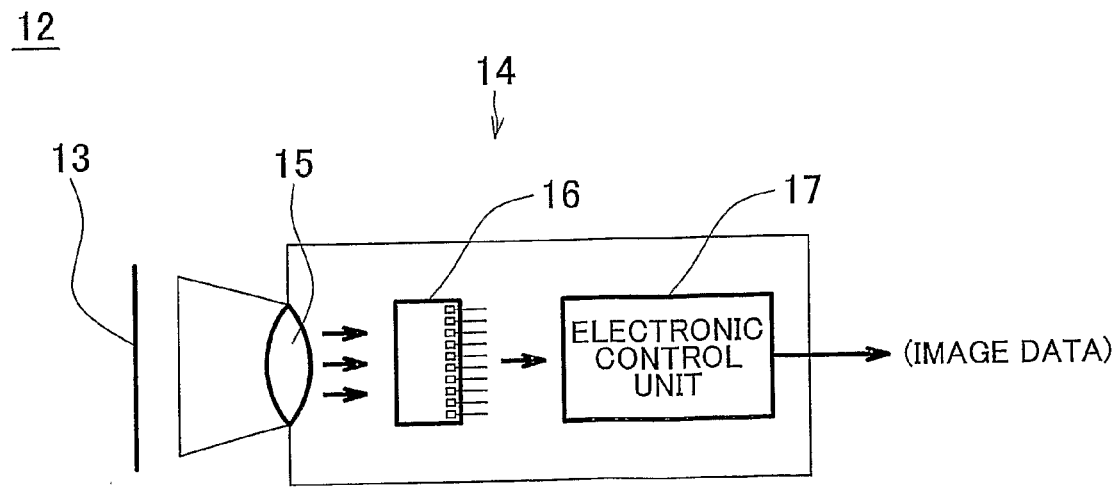
FIG. 2 is an example of the configuration of an infrared camera 12.

FIG. 2 is an example of the configuration of the infrared camera 12. The infrared camera 12 includes, for example, a visible light cut filter 13 and a charge coupled device (CCD) camera 14. The CCD camera 14 includes, for example, an image capturing lens 15, an image sensor 16 and an electronic control unit 17. Note that the infrared camera 12 may include a complementary metal-oxide-semiconductor (CMOS) camera, or the like, instead of the CCD camera. The visible light cut filter 13 is, for example, stuck on the front glass.

The image sensor 16 is, for example, an interline image sensor. The image sensor 16 has photodiodes, CCDs and transfer gates. The photodiodes are photoreceptors that carry out photoelectric conversion and arranged in a two-dimensional planar shape. The CCDs are arranged in a two-dimensional planar shape in correspondence with the photodiodes. The transfer gates are provided between the photodiodes and the CCDs, and function as analog switches. A light condensing microlens is attached in front (image capturing lens 15 side) of each photodiode. Note that the above structure is just schematically illustrated to simply describe the functions of the image sensor 16, and any design change for improvement in function, or the like, may be allowed. In addition, the image sensor 16 is not limited to the interline image sensor; it may be a full-frame transfer or frame transfer image sensor of which the CCD itself functions as a photoreceptor.

The electronic control unit 17 is, for example, a microcomputer, an electronic circuit, or the like. The electronic control unit 17 controls the open-close timing of each transfer gate of the image sensor 16 to regulate the shutter speed or image capturing period (for example, about several tens of times per one second) of the infrared camera 12. Then, the electronic control unit 17, for example, amplifies data, output from the output circuit of the image sensor 16, with a predetermined gain, and then outputs the amplified data to the night vision support ECU 40 as image data.

Here, the irradiation range of the infrared irradiation device substantially coincides with the irradiation range of the infrared camera 12. The image capturing range of the infrared camera 12 has an angle narrower than that of the irradiation range of the head lamps so as to be able to capture a more remote image.

The main display 20 is a touch panel display device. The main display 20 is installed at, for example, the center portion of an instrument panel, or the like, and uses a video graphics array (VGA) as a graphic system to display an image including a moving image. The main display 20 detects a variation in voltage caused by user's touching the display surface to thereby recognize a touched position. With that, various GUI switches are set on the display surface to allow the user to conduct various input operations. In addition, a plurality of switches that allow various operations are provided around the display surface of the main display 20.

The main display 20 may be shared as a display/input device of another in-vehicle device, such as a navigation system. In this case, the main display 20 functions as the main display 20 only when the vehicle night vision support system 1 is in operation (in the nighttime), and functions as the display/input device of another in-vehicle device during times other than the nighttime.

The sub-display 30 is, for example, an HUD. The sub-display 30 projects an image at a display position on the front glass to display the image as a virtual image that is seen as if the image were present at a position on an extension of line of sight when the display position is viewed from the eyepoint of a driver.

The entire sub-display 30 is, for example, accommodated in a recess formed on the upper surface of the instrument panel. The sub-display 30 includes a liquid crystal display, a reflector, and the like. The liquid crystal display is arranged on the back side of a combination meter and emits display light toward the traveling direction of the vehicle. The reflector reflects light emitted from the liquid crystal display to thereby project the reflected light on a windshield.

The night vision support ECU 40 is, for example, a microcomputer in which a central processing unit (CPU), a read only memory (ROM), a random access memory (RAM), and the like, are connected to one another via a bus. The night vision support ECU 40 further includes a storage device, such as a hard disc drive (HDD), a digital versatile disk (DVD) drive, a compact disc-recordable (CD-R) drive and an electronically erasable and programmable read only memory (EEPROM), an I/O port, a timer, a counter, and the like. The storage device stores programs and data executed by the CPU.

In-vehicle sensors, such as a vehicle speed sensor 50 and a steering angle sensor 52, are connected to the night vision support ECU 40 via an in-vehicle communication line, such as a multiplex communication line. The vehicle speed sensor 50 includes, for example, a skid control computer and a wheel speed sensor attached to each wheel of the vehicle. The skid control computer converts a wheel speed pulse signal, output from each wheel speed sensor, into a vehicle speed rectangular wave pulse signal (a vehicle speed signal), and outputs the vehicle speed signal. Each wheel speed sensor, for example, includes a magnetic rotor and an active sensor. In the magnetic rotor, rubber is filled with magnetic powder and then positive electrodes and negative, electrodes are alternately arranged in the circumferential direction. The active sensor detects a variation in magnetic field due to rotation of the magnetic rotor. The steering angle sensor 52 is, for example, arranged inside a steering column, and outputs a steering angle signal. Communication among the devices via the multiplex communication line is carried out using an appropriate communication protocol. The communication protocol, for example, includes a low-speed body communication protocol, a multimedia communication protocol and a FlexRay. The low-speed body communication protocol is typically a controller area network (CAN) or a local interconnect network (LIN). The multimedia communication protocol is typically a media oriented systems transport (MOST).

In addition, the night vision support ECU 40 includes a pedestrian recognition unit 42, a pedestrian estimation unit 44 and a display control unit 46 as major functional blocks. The major functional blocks function in such a manner that the CPU executes the programs stored in the storage device. Note that these functional blocks need not be based on distinctly different programs; one program may contain portions that implement a plurality of functional blocks.

Here, the vehicle night vision support system 1 is activated by a command from a user through, for example, a GUI switch prepared on the display surface of the main display 20 or a switch attached around the main display 20. Instead, the vehicle night vision support system 1 may be automatically activated when the outside illuminance detected by an illuminance sensor is lower than a predetermined value.

As the vehicle night vision support system 1 is activated, an image captured by the infrared camera 12 is displayed on the main display 20.

The pedestrian recognition unit 42 determines whether there is a pedestrian, for example, in the image captured by the infrared camera 12 (in the present embodiment, the captured image is the same as the image displayed on the main display 20). The recognition of a pedestrian in the pedestrian recognition unit 42 is carried out by, for example, a step of extracting feature points from the image captured by the infrared camera 12 and a step of applying pattern matching to a series of feature points indicating the outline of an object to determine whether the object is a pedestrian. The feature points may be simply defined as points of which the luminance difference between the adjacent pixels is larger than or equal to a predetermined value; instead, characteristic points may be extracted using a specific filter for this kind of image processing.

When the pedestrian recognition unit 42 determines that there is a pedestrian in the image captured by the infrared camera 12, the display control unit 46 controls the main display 20 so as to superimpose a rectangular outline (just an example) for emphasizing the recognized pedestrian, on the image of the recognized pedestrian. Superimposing the rectangular outline is a so-called overlay display, and is carried out in such a manner that part of pixel values that indicate the image captured by the infrared camera 12 are replaced with a desired pixel value. Hereinafter, such a image is termed emphasized image.

In addition, when the pedestrian recognition unit 42 determines that there is a pedestrian in the image captured by the infrared camera 12, the display control unit 46 controls the sub-display 30 so as to display information for notifying a driver of the presence of the pedestrian, such as an icon that indicates a pedestrian, at a desired position. The desired position may be always constant; however, it may be changed depending on, for example, whether a pedestrian is recognized on the right side or left side of the vehicle. Hereinafter, the above information, such as an icon that indicates a pedestrian, is termed warning information.

Figure 3:
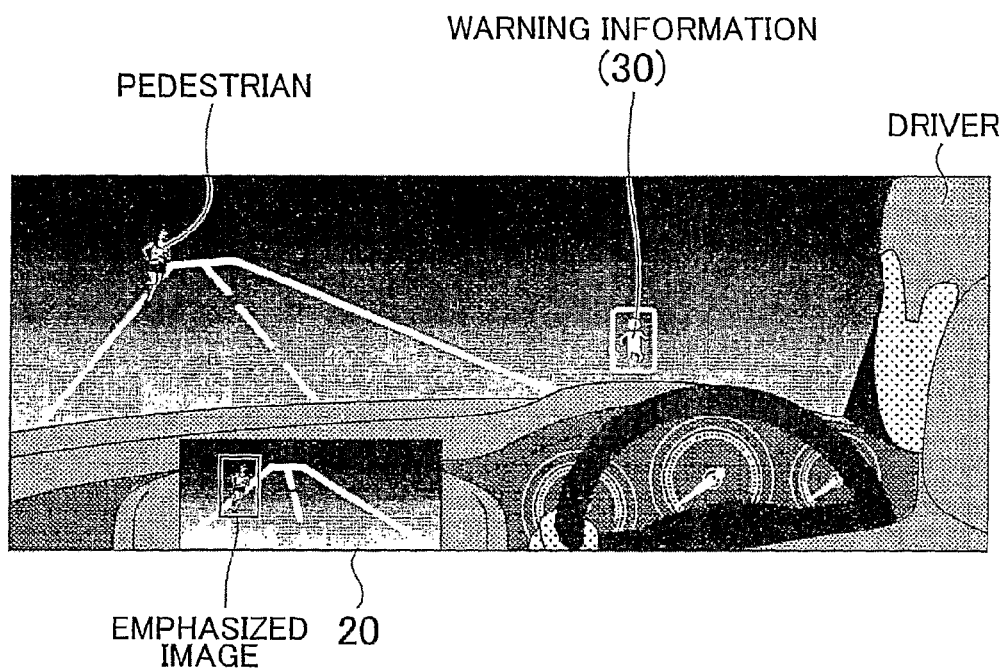
FIG. 3 is a view that shows a state where an infrared image ahead of a vehicle and an emphasized image are displayed on a main display 20 and warning information is displayed on a sub-display 30.

Through the above controls, when there is a pedestrian ahead of the vehicle, the driver initially sees the sub-display 30 to recognize the presence of the pedestrian, and then looks at the main display 20 to check the position and behavior of the pedestrian. By so doing, it is possible for the driver to safely drive the vehicle so as not to have a collision, or the like. FIG. 3 is a view that shows a state where the infrared image ahead of the vehicle and the emphasized image are displayed on the main display 20 and the warning information is displayed on the sub-display 30.

Figure 5:
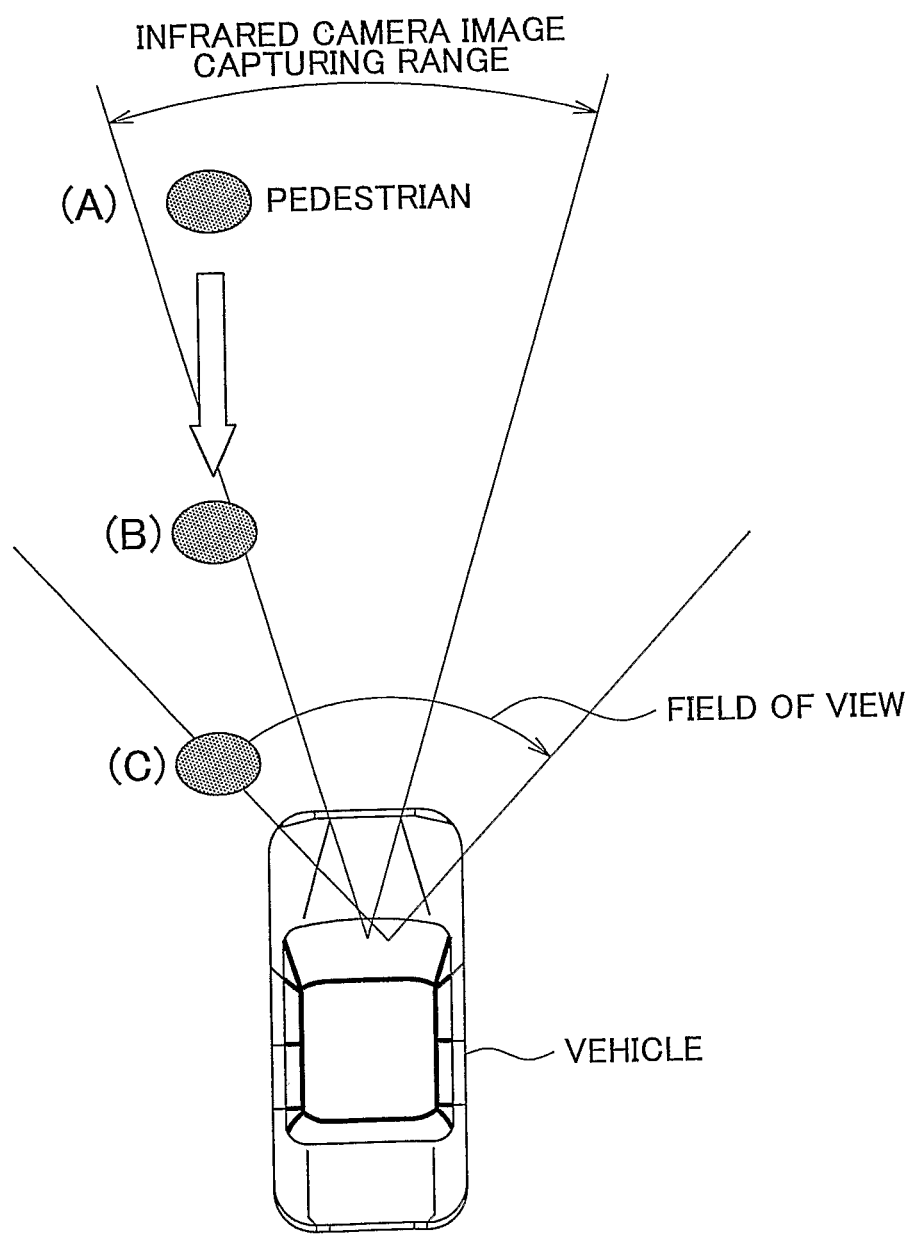
FIG. 5 is a view that shows the relationship between the image capturing range of the infrared camera 12 and the field of view of a driver.

However, as described above, the image capturing range of the infrared camera 12 has an angle narrower than that of the irradiation range of the head lamps, so even a pedestrian that has disappeared from the image displayed on the main display 20 may possibly remain in the field of view of the driver (which is assumed to be substantially equal to the irradiation range of the head lamps in the nighttime). FIG. 5 is a view that shows the relationship between the image capturing range of the infrared camera 12 and the field of view of a driver.

Thus, if the display control unit 46 displays warning information on the sub-display 30 only when the pedestrian recognition unit 42 determines that there is a pedestrian in the image captured by the infrared camera 12 (in the case of (A) in FIG. 5), the warning information disappears from the sub-display 30 notwithstanding the pedestrian that has disappeared from the image displayed on the main display 20 remains in the field of view of the driver. Therefore, the driver may experience a feeling of strangeness.

Then, the vehicle night vision support system 1 according to the present embodiment includes the pedestrian estimation unit 44 that estimates (determines) whether a pedestrian that has disappeared from the image displayed on the main display 20 is present in the field of view of the driver. Even when the pedestrian estimation unit 44 estimates that a pedestrian that has disappeared from the image displayed on the main display 20 is present in the field of view of the driver (in the case of (B) in FIG. 5), the warning information is still displayed on the sub-display 30.

The pedestrian estimation unit 44, for example, performs estimation in the following steps. First, a relative position of a pedestrian, recognized by the pedestrian recognition unit 42, with respect to the vehicle is calculated on the basis of the position of the pedestrian on the image (actually, the pedestrian has a predetermined size, so the feet, or the like, are used as representative points). The relative position is, for example, calculated in the form of a combination of a distance and a bearing angle with reference to the central axis of the vehicle. Subsequently, the velocity vector of the vehicle is calculated on the basis of the vehicle speed signal input from the vehicle speed sensor 50 and the steering angle signal input from the steering angle sensor 52. Then, by integrating the velocity vector of the vehicle in stages (by varying the time range of integration) with the position of the pedestrian invariant, a plurality of future positions of the vehicle are calculated to thereby calculate a period of time that is taken until the vehicle reaches the position at which the pedestrian falls outside the field of view of the driver for the first time. It may be estimated that the pedestrian is present in the field of view of the driver during a period of time from the timing the pedestrian recognition unit 42 recognizes the pedestrian to the timing the vehicle reaches the position at which the pedestrian falls outside the field of view of the driver.

With the above control, when a pedestrian that has disappeared from the image displayed on the main display 20 remains in the field of view of the driver, the sub-display 30 continuously provides the warning information. Thus, it is possible to prevent the driver from experiencing a feeling of strangeness. In addition, such a situation that a pedestrian remains in the field of view of the driver still requires attention to the pedestrian when driving. Thus, by continuing the warning information display of the sub-display 30, it is possible to contribute to further safe driving.

Figure 4:
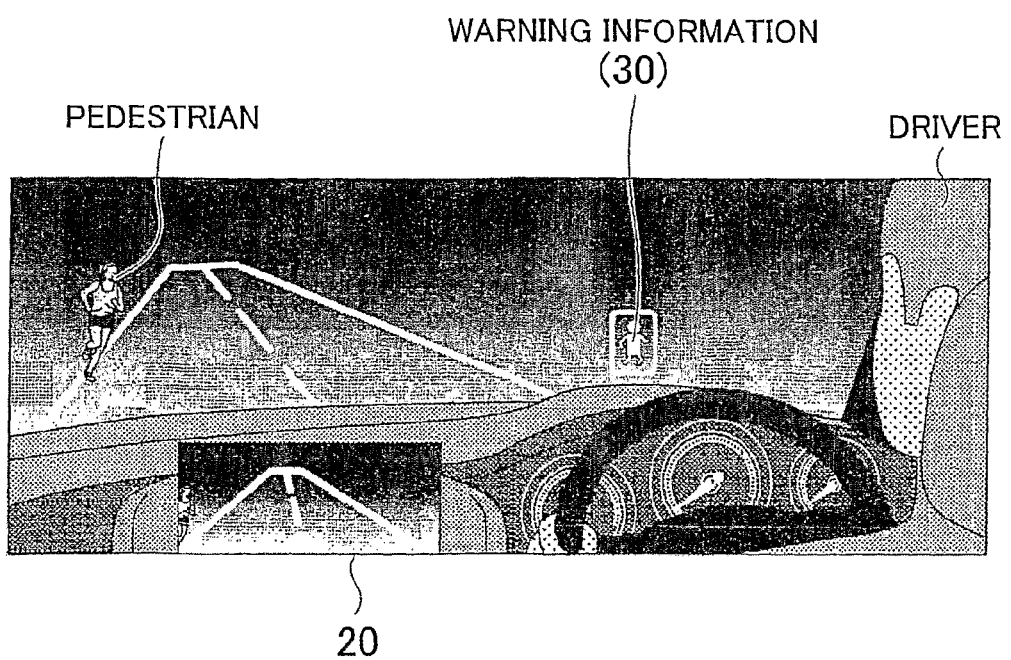
FIG. 4 is a view that shows a state where the emphasized image disappears from the main display 20 but the warning information is still displayed on the sub-display 30.

FIG. 4 is a view that shows a state where the emphasized image disappears from the main display 20 but the warning information is still displayed on the sub-display 30.

Figure 6:
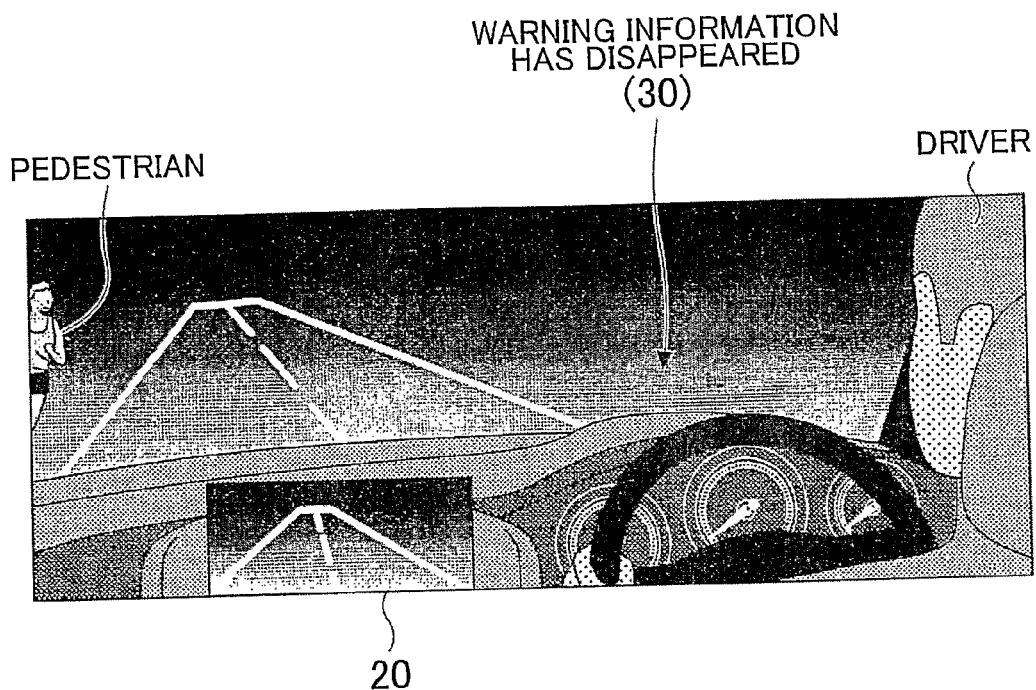
FIG. 6 is a view that shows a state where it is determined that a pedestrian has reached the outside of the field of view of the driver and then the warning information is turned off.

Then, when the period of time from the timing the pedestrian recognition unit 42 recognizes a pedestrian to the timing the vehicle reaches the position at which the pedestrian falls outside the field of view of the driver has elapsed, the pedestrian estimation unit 44 determines that no pedestrian is present in the field of view of the driver. When the pedestrian estimation unit 44 determines that no pedestrian is present in the field of view of the driver, the display control unit 46 controls the sub-display 30 so as to turn off the warning information display. FIG. 6 is a view that shows a state where it is determined that the pedestrian has reached the outside of the field of view of the driver and then the warning information display is turned off.

Figure 7:
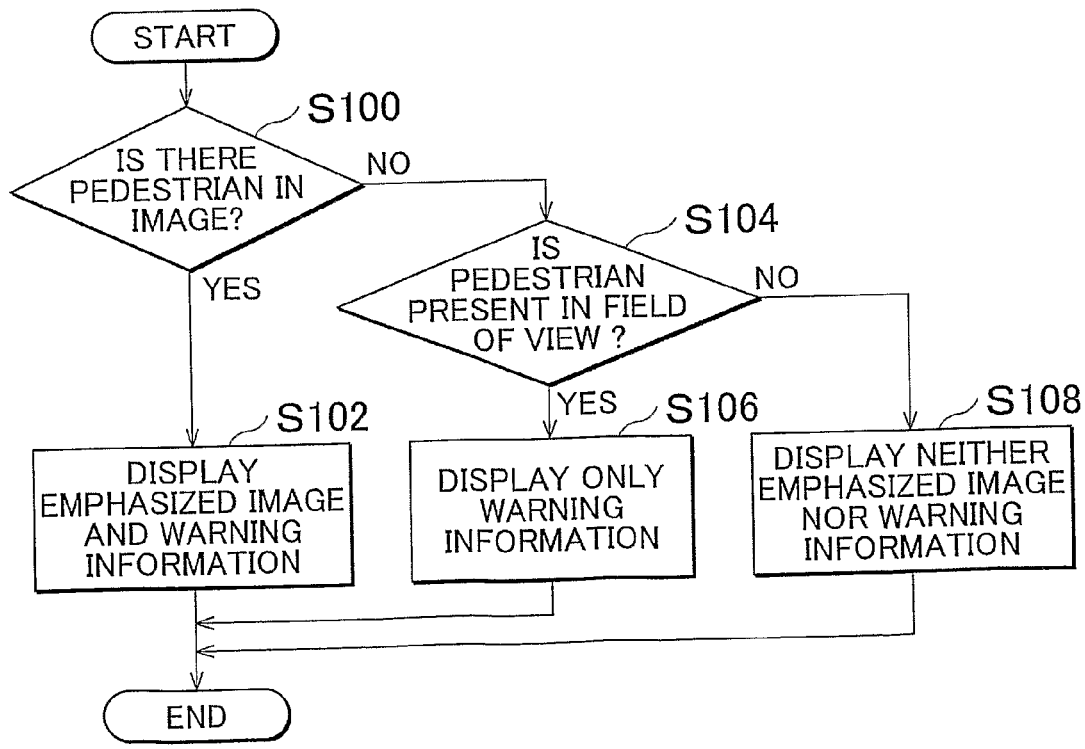
FIG. 7 is a flowchart that shows the flow of characteristic processes executed by a night vision support ECU 40 according to the first embodiment.

Hereinafter, the flow of the above described processes will be described using a flowchart. FIG. 7 is a flowchart that shows the flow of characteristic processes executed by the night vision support ECU 40 according to the first embodiment. This flow is repeatedly executed while the vehicle night vision support system 1 is in operation.

First, the pedestrian recognition unit 42 determines whether there is a pedestrian in an image captured by the infrared camera 12 (S100).

When the pedestrian recognition unit 42 determines that there is a pedestrian in the image captured by the infrared camera 12, the display control unit 46 controls the main display 20 so as to emphasize the pedestrian on the image (to display an emphasized image) and controls the sub-display 30 so as to display warning information (S102).

When the pedestrian recognition unit 42 determines that there is no pedestrian in the image captured by the infrared camera 12, the pedestrian estimation unit 44 estimates (determines) whether a pedestrian that has disappeared from the image displayed on the main display 20 is present in the field of view of the driver (S104).

When the pedestrian estimation unit 44 determines that a pedestrian that has disappeared from the image displayed on the main display 20 is present in the field of view of the driver, the display control unit 46 controls the sub-display 30 so as to display the warning information (S106).

On the other hand, when the pedestrian estimation unit 44 determines that no pedestrian that has disappeared from the image displayed on the main display 20 is present in the field of view of the driver, neither emphasized image nor warning information is displayed (S108).

With the vehicle night vision support system 1 according to the above described embodiment, when a pedestrian that has disappeared from an image displayed on the main display 20 remains in the field of view of the driver, the sub-display 30 continuously provides warning information, so it is possible to prevent the driver from experiencing a feeling of strangeness. In addition, by continuing the warning information display of the sub-display 30 in such a situation that requires attention when driving, it is possible to contribute to further safe driving.

Hereinafter, a vehicle night vision support system 2 according to a second embodiment of the invention will be described. The hardware configuration of the vehicle night vision support system 2 is the same as that of the vehicle night vision support system 1 according to the first embodiment, so the description of the basic configuration, or the like, is omitted and the difference from the first embodiment will be specifically described.

As the vehicle night vision support system 2 according to the present embodiment is activated, only the center portion, excluding the right and left ends, of an image captured by the infrared camera 12 is displayed on the main display 20. Such a display is intended to, for example, avoid hunting of emphasized image.

Thus, even when the pedestrian recognition unit 42 determines that there is a pedestrian in the image captured by the infrared camera 12, there is a possibility that neither pedestrian nor emphasized image is displayed on the main display 20.

In the present embodiment, an emphasized image is displayed on the main display 20 and warning information is provided on the sub-display 30 when there is a pedestrian in the center portion, excluding the right and left ends, of the image captured by the infrared camera 12.

On the other hand, no emphasized image is displayed on the main display 20 but warning information is provided on the sub-display 30 when there is a pedestrian in the right or left end of the image captured by the infrared camera 12 or when the pedestrian estimation unit 44 estimates that a pedestrian that has disappeared from the image displayed on the main display 20 is present in the field of view of the driver.

That is, when there is a pedestrian in the center portion, excluding the right and left ends, of the image captured by the infrared camera 12, both an emphasized image and warning information are displayed. In addition, when there is a pedestrian in the right or left end of the image captured by the infrared camera 12 (when the presence of a pedestrian is detected through image recognition) or when the pedestrian estimation unit 44 estimates that a pedestrian that has disappeared from the image displayed on the main display 20 is present in the field of view of the driver, only warning information is displayed.

Figure 8:
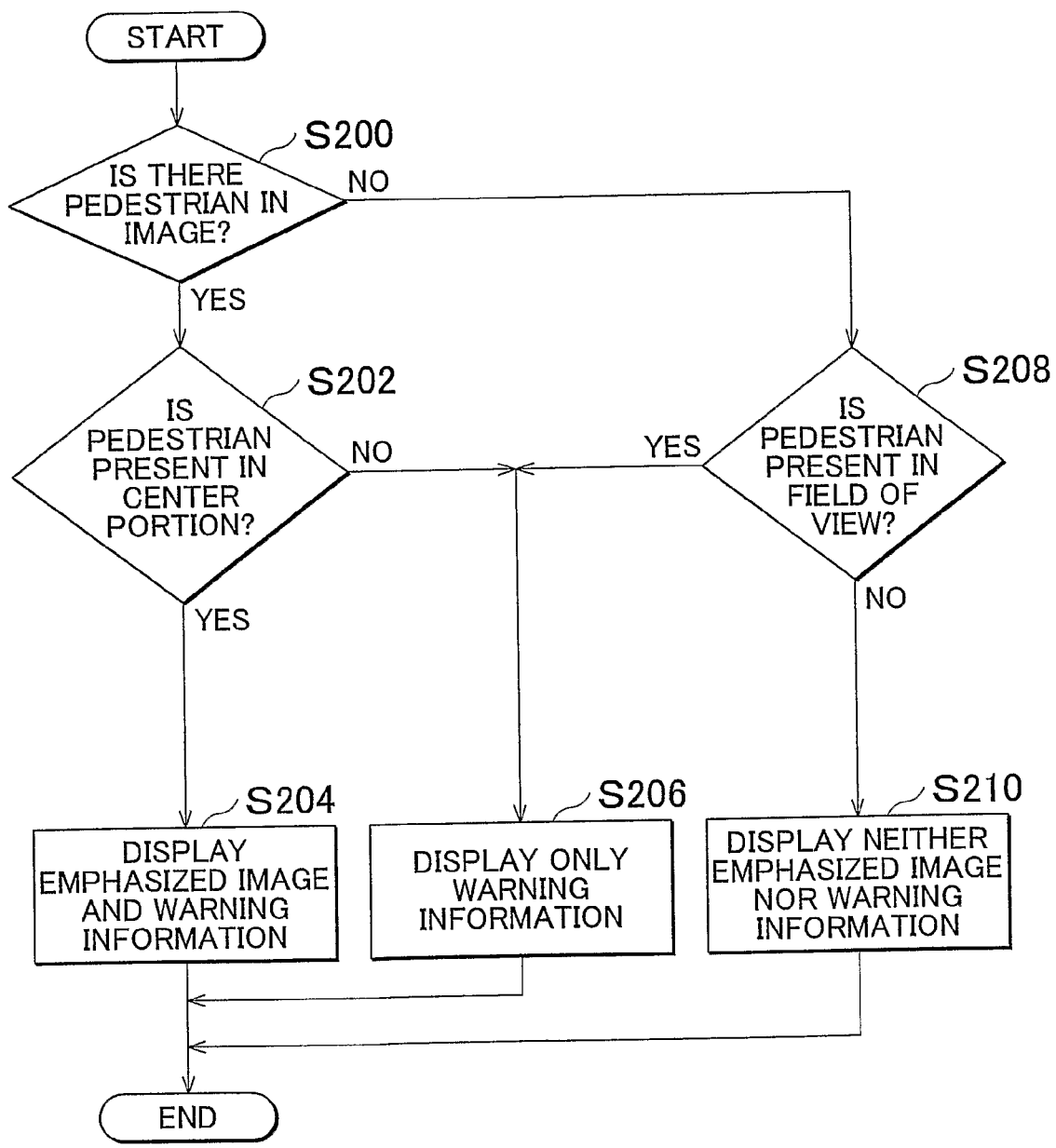
FIG. 8 is a flowchart that shows the flow of characteristic processes executed by a night vision support ECU 40 according to the second embodiment.

Hereinafter, the flow of the above described processes will be described using a flowchart. FIG. 8 is a flowchart that shows the flow of characteristic processes executed by the night vision support ECU 40 according to the second embodiment. This flow is repeatedly executed while the vehicle night vision support system 2 is in operation.

First, the pedestrian recognition unit 42 determines whether there is a pedestrian in an image captured by the infrared camera 12 (S200).

When the pedestrian recognition unit 42 determines that there is a pedestrian in the image captured by the infrared camera 12, the pedestrian recognition unit 42 further determines whether there is a pedestrian in the center portion of the captured image (S202).

When it is determined that there is a pedestrian in the center portion of the captured image, the display control unit 46 controls the main display 20 so as to display an emphasized image of the pedestrian and controls the sub-display 30 so as to display warning information (S204).

In addition, when it is determined that the pedestrian recognition unit 42 determines that there is a pedestrian in the right or left end of the captured image, the display control unit 46 controls the sub-display 30 so as to display the warning information (S206).

On the other hand, when the pedestrian recognition unit 42 determines that there is no pedestrian in the image captured by the infrared camera 12, the pedestrian estimation unit 44 estimates (determines) whether a pedestrian that has disappeared from the image displayed on the main display 20 is present in the field of view of the driver (S208).

When the pedestrian estimation unit 44 determines that a pedestrian that has disappeared from the image displayed on the main display 20 is present in the field of view of the driver, the display control unit 46 controls the sub-display 30 so as to display the warning information (S206).

When the pedestrian estimation unit 44 determines that no pedestrian that has disappeared from the image displayed on the main display 20 is present in the field of view of the driver, neither emphasized image nor warning information is displayed (S210).

With the vehicle night vision support system 2 according to the above described embodiment, when a pedestrian that has disappeared from an image displayed on the main display 20 remains in the field of view of the driver, the sub-display 30 continuously provide warning information, so it is possible to prevent the driver from experiencing a feeling of strangeness. In addition, by continuing the warning information display of the sub-display 30 in such a situation that requires attention when driving, it is possible to contribute to further safe driving.

The aspect of the invention is not limited to the embodiments described above; it may be modified or replaced in various forms without departing from the scope of the invention.

For example, a warning target object intended for emphasized image or warning information may be an object other than a pedestrian. In addition, specific embodiments of the main display 20 and sub-display 30 are not limited to the ones described in the above embodiments; instead, for example, a display unit provided in a combination meter may be used as the sub-display 30.

In addition, in consideration of a period of time from when the driver sees warning information on the sub-display 30 to when the driver looks at the main display 20, the period of time may be reflected on control.

The aspect of the invention is useable in automobile manufacturing, automobile parts manufacturing, and the like.

The invention claimed is:

1. A vehicle night vision support system comprising:
   an infrared camera that captures an image ahead of a vehicle;
   a main display that displays the image captured by the infrared camera;
   a sub-display; and
   a control unit that (1) determines whether there is an object in the displayed image on the main display and, when the control unit determines that the object is in the displayed image, controls the sub-display so as to display warning information on the object, (2) calculates a relative position of the object with respect to the vehicle on the basis of a position of the object in the displayed image, (3) estimates or detects whether the object has disappeared from the displayed image but is present in the field of view of the driver, and (4) estimates a time from a time that the object has disappeared in the image displayed on the main display to a time that the object has reached the outside of the field of view of the driver, based on the relative position, wherein
   when the control unit estimates or detects that the object that has disappeared from the displayed image but is present in the field of view of the driver, the control unit controls the sub-display so as to display the warning information for the estimated time from the time that the object has disappeared in the image displayed on the main display.

2. The vehicle night vision support system according to claim 1, wherein the sub-display is a head up display.

3. The vehicle night vision support system according to claim 1, further comprising:
   a vehicle speed detector that detects a vehicle speed; and
   a steering angle detector that detects a steering angle, wherein
   the control unit estimates whether the object has disappeared from the displayed image but is present in the field of view of the driver on the basis of the relative position and a driving state of the vehicle, calculated on the basis of the vehicle speed detected by the vehicle speed detector and the steering angle detected by the steering angle detector.

4. The vehicle night vision support system according to claim 3, wherein
   the control unit calculates a future position of the vehicle on the basis of the driving state of the vehicle, and
   the control unit estimates whether the object has disappeared from the displayed image but is present in the field of view of the driver on the basis of a position of the vehicle which is calculated on the basis of the future position of the vehicle at which the object falls outside the field of view of the driver for the first time.

5. The vehicle night vision support system according to claim 4, wherein until the vehicle reaches the position of the vehicle at which the object falls outside the field of view of the driver for the first time, the control unit estimates that the object has disappeared from the displayed image but is present in the field of view of the driver.

6. The vehicle night vision support system according to claim 1, wherein
the main display displays a center portion of the image captured by the infrared camera with respect to a horizontal direction of the captured image.

7. The vehicle night vision support system according to claim 6, wherein
the control unit determines whether there is an object in the captured image other than the center portion and, when the control unit determines that the object is in the captured image other than the center portion, controls the sub-display so as to display the warning information.

8. The vehicle night vision support system according to claim 1, wherein
when the control unit determines that the object is in the displayed image, the control unit controls the main display so as to emphasize the object on the displayed image.

9. The vehicle night vision support system according to claim 1, wherein
the object is a pedestrian.

10. A control method for a vehicle night vision support system that includes an infrared camera that captures an image ahead of a vehicle, a main display that displays the image captured by the infrared camera and a sub-display, the control method comprising:
   determining whether there is an object in the displayed image on the main display;
   when it is determined that the object is in the displayed image, controlling the sub-display so as to display warning information on the object;
   calculating a relative position of the object with respect to the vehicle on the basis of a position of the object in the displayed image;
   estimating or detecting whether the object has disappeared from the displayed image but is present in the field of view of the driver; and
   estimating a time from a time that the object has disappeared in the image displayed on the main display to a time that the object has reached the outside of the field of view of the driver, based on the relative position, wherein
   when it is estimated or detected that the object has disappeared from the displayed image but is present in the field of view of the driver, controlling the sub-display so as to display the warning information for the estimated time from the time that the object has disappeared in the image displayed on the main display.

* * * * *